US009329416B2

(12) United States Patent
Regelman et al.

(10) Patent No.: US 9,329,416 B2
(45) Date of Patent: May 3, 2016

(54) METHOD FOR BRIGHTNESS ENHANCEMENT AND MODES MANIPULATION OF A MULTIMODE OPTICAL FIBER

(71) Applicant: RAFAEL ADVANCED DEFENSE SYSTEMS LTD., Haifa (IL)

(72) Inventors: Dan Vadim Regelman, Kiryat Bialik (IL); Yehonatan Segev, Haifa (IL); Shay Yosub, Kiryat Bialik (IL)

(73) Assignee: RAFAEL ADVANCED DEFENSE SYSTEMS LTD., Haifa (IL)

( * ) Notice: Subject to any disclaimer, the term of this patent is extended or adjusted under 35 U.S.C. 154(b) by 0 days.

(21) Appl. No.: 14/404,221

(22) PCT Filed: May 26, 2013

(86) PCT No.: PCT/IL2013/050452
§ 371 (c)(1),
(2) Date: Nov. 26, 2014

(87) PCT Pub. No.: WO2013/179281
PCT Pub. Date: Dec. 5, 2013

(65) Prior Publication Data
US 2015/0131936 A1      May 14, 2015

(30) Foreign Application Priority Data

May 28, 2012   (IL) .......................................... 220027

(51) Int. Cl.
*G02F 1/035*      (2006.01)
*G02B 6/14*       (2006.01)
(Continued)

(52) U.S. Cl.
CPC   *G02F 1/035* (2013.01); *G02B 6/14* (2013.01); *G02F 1/0115* (2013.01); *H01S 3/067* (2013.01)

(58) Field of Classification Search
None
See application file for complete search history.

(56) References Cited

U.S. PATENT DOCUMENTS

| 3,944,811 A | 3/1976 | Midwinter |
| 5,473,457 A | 12/1995 | Ono |
| 5,903,684 A * | 5/1999 | Payton .................. G02F 1/0136 385/1 |

(Continued)

FOREIGN PATENT DOCUMENTS

| CN | 102646916 | 8/2012 |
| WO | 02071133 A2 | 9/2002 |

OTHER PUBLICATIONS

F. Roddier, "Adaptive Optics in Astronomy", Cambridge University Press, Cambridge, England, 1999, pp. 1-9.

(Continued)

*Primary Examiner* — Rhonda Peace
(74) *Attorney, Agent, or Firm* — Roach Brown McCarthy & Gruber, P.C.; Kevin D. McCarthy

(57) ABSTRACT

The invention relates to adaptive optics techniques applied to alter the modal structure of light propagating in an optical fiber. In particular the invention relates to altering the modal structure in a multimode beam propagating in a multimode fiber by lowering the number of higher modes. The method comprises combining a wavefront sensor and/or a power sensor with a phase control actuator and actuator control algorithms, to alter the phase structure of the beam thereby to eliminate higher modes. The corrected beam can be then effectively coupled into a smaller diameter fiber with minimum loss of energy and concentrated to smaller spot sizes limited by diffraction.

4 Claims, 15 Drawing Sheets

(51) Int. Cl.
*G02F 1/01* (2006.01)
*H01S 3/067* (2006.01)

(56) References Cited

U.S. PATENT DOCUMENTS

| | | | |
|---|---|---|---|
| 6,493,474 | B1 | 12/2002 | Yao |
| 6,535,678 | B1* | 3/2003 | Yamauchi .......... G02B 6/02019 385/123 |
| 6,594,408 | B1* | 7/2003 | Noe .................. H04B 10/2569 385/11 |
| 6,718,087 | B2* | 4/2004 | Choa ................. H04B 10/2581 385/147 |
| 6,754,404 | B2* | 6/2004 | Yao ...................... G02F 1/0136 359/489.06 |
| 7,194,155 | B1 | 3/2007 | Kahn et al. |
| 7,617,060 | B1* | 11/2009 | Rauch ...................... G01J 9/00 356/124 |
| 7,945,130 | B2* | 5/2011 | Yan .......................... G02B 6/14 385/1 |
| 2004/0258353 | A1 | 12/2004 | Gluckstad et al. |
| 2008/0267560 | A1* | 10/2008 | DiGiovanni ............ G02B 6/14 385/28 |
| 2009/0169220 | A1 | 7/2009 | Kahn et al. |
| 2010/0290738 | A1* | 11/2010 | Yan .......................... G02B 6/14 385/28 |
| 2014/0212089 | A1* | 7/2014 | Dimmick ................ G02B 6/24 385/27 |
| 2015/0131936 | A1* | 5/2015 | Regelman ............... G02F 1/035 385/3 |
| 2015/0323744 | A1* | 11/2015 | Dimmick ................ G02B 6/24 385/20 |

OTHER PUBLICATIONS

Shaping the light transmission . . . biophotonics, Tomas Cizmar, Kishan Dholakia, Sep. 14, 2011.
Adaptive Compensation of Multimode Fiber Dispersion by Control of Launched Amplitude, Phase, and Polarization Mandieh B. Shemirani, Jeffrey P. Wilde, Member, IEEE, and Joseph M. Kahn, Fellow, IEEE, Journal of Lightwave Technology, vol. 28, No. 18, Sep. 15, 2010—13 pages.
W. Q. Thornburg et al., "Selective launching of higher-order modes into an optical fiber with an optical phase shifter". Optics Letters, vol. 19, No. 7, 1994, pp. 454-456.
Michael Bass—Editor in chief, Handbook of optics, vol. 3, 2nd edition, 2001, pp. 1.4-1.11.
H. Babcock, "The possibility of compensating astronomical seeing", Publications of the Astronomical Society of the Pacific 65: 229-236, Oct. 1953.
E. N. Ribak et al., "Speckle reduction in ocular wave-front sensing", Adaptive Optics: Analysis and Methods, OSA, Ed. B, Ellerbroek, Vancouver, Canada, Jun. 2007.
X. Shen et al., "Compensation for multimode fiber dispersion by adaptive optics", Optics Letters, vol. 30, No. 22, 2005, pp. 2985-2987.
G. P. Agrawal, "Applications of non-linear fiber optics", Academic Press, 2001, pp. 201-250.
V. Laude et al., "Photonic band-gap guidance of acoustic modes in photonic crystal fibers", Phys. Rev B 71, 045107, 2005.
Written Opinion of International Search for PCT/IL2013/050452; mailed Dec. 11, 2014; 10 pages.
Communication and Supplemental European Search Report from a counterpart foreign application—EP 13 79 6685—mailed on Jan. 18, 2016; 12 pages.
De Lima Monteiro D W et al: "High speed wavefront sensor compatible with standard CMOS technology" Sensors and Actuators A, Elsevier Sequoia S.A., Lausanne, CH, Jan. 1, 2004, 11 pages.
Masaaki Imai et al: "Excitation of fundamental and low order modes of optical fiber waveguides by gaussian beams 1: titled beams". Aug. 1, 1974, 7 pages.
J. Saijonmaa et al: "Optimal excitation of multimode graded index fibres in d.m.d and d.m.a. measurements" Jan. 1, 1980, 3 pages.
Jeong H et al: "Enhancement of butt coupling pump efficiency in a new nddoped large core double clade fiber laser cavity adiabatically tapered at both ends" Nov. 11, 2001, 1 page.
Raz Nasiri Mahalati et al: "Adaptive control of input field to achieve desired output intensity profile in multimode fiber with random mode express" Jun. 18, 2012, 17 pages.
Cizmar et al., "Shaping the light transmission through a multimode optical fibre: complex transformation analysis and applications in biophotonics"; Optics Express, vol. 19, Issue 20, 21 pages; published in 2011.
De Lima Monteiro D W et al: "High speed wavefront sensor compatible with standard CMOS technology" Sensors and Actuators A, Elsevier Sequoia S.A., Lausanne, CH, Jan. 1, 2004—11 pages.
Masaaki Imai et al: "Excitation of fundamental and low order modes of optical fiber waveguides by gaussian beams 1: titled beams". Applied Optics, vol. 13, No. 8, p. 1893, Aug. 1, 1974—7 pages.
J. Saijonmaa et al: "Optimal excitation of multimode graded index fibres in d.m.d and d.m.a. measurements", Electronics Letters, vol. 16, No. 18, p. 690, Jan. 1, 1980—3 pages.
Jeong H et al: "Enhancement of butt coupling pump efficincy in a new nd-doped large core double clade fiber laser cavity adiabatically tapered at both ends", Conference on Lasers and Electro-Optics, Technical Digest. Postconference Edition, May 6-11, 2001; OSA, vol. 56, p. 320 May 6, 2001—1 page.
Reza Nasiri Mahalati et al: "Adaptive control of input field to achieve desired output intensity profile in multimode fiber with random mode coupling", Optics Express, vol. 20, No. 13, p. 14321. Jun. 18, 2012—17 pages.
Communication and Supplementary European Search Report from a counterpart foreign application—EP 13 79 6685—mailed Jan. 18, 2016—12 pages.

\* cited by examiner

METHOD FOR BRIGHTNESS ENHANCEMENT AND MODES MANIPULATION OF A MULTIMODE OPTICAL FIBER

FIELD OF THE INVENTION

The present invention relates to optical fibers. More particularly the invention relates to a method for altering modal structure of light propagating in an optical fiber.

BACKGROUND OF THE INVENTION

Optical fibers are of great importance in many fields of science and technology. There are various parameters of optical fibers affecting their properties; one of the most important is the number of modes capable of non-attenuated propagation. Fibers carrying only a single transverse mode are called single mode (SM) fibers. Fibers capable of propagating more than one mode are called multimode fibers (MM). Different fiber modes have different propagation properties, e.g. group velocity, spatial intensity and phase profiles. Modal group velocity dependence in MM fibers affects the fiber's ability to transmit data along longer distances. Intensity and phase dependence affect the beam quality factor, i.e. the $M^2$ parameter, of the beam exiting the fiber. This is important in laser application of fibers, when the laser beam quality degrades due to higher fiber modes.

Modal structure of the beam propagating in optical fiber depends on the beam intensity and phase profile at the fiber input. Thus by altering the beam properties at fiber input (W. Q. Thornburg et al., "*Selective launching of higher-order modes into an optical* fiber with an optical phase shifter". Optics Letters, Vol. 19, No. 7, 1994, pgs. 454-456) or output, one can change the modal structure of the exiting beam. A common technique for controlling the phase of an optical beam is adaptive optics (Michael Bass—Editor in chief, *Handbook of optics*, Vol. 3, $2^{nd}$ edition, 2001, pages 1.4-1.11). Adaptive optics is widely used in astronomical observations, where in order to achieve high resolution images, light phase should be dynamically compensated due to atmospheric turbulence distortions. Adaptive optics technology is based on sensing the incident beam phase by phase sensors and subsequent correction by an array of dynamic elements capable of altering the phase profile of the beam (H. Babcock, "*The possibility of compensating astronomical seeing*", Publications of the Astronomical Society of the Pacific 65: 229-236, October, 1953). Phase altering arrays are based on piezoelectric actuated membrane mirrors or liquid crystal based phase masks. Adaptive optics technology has already made great impact in astronomical telescopes (F. Roddier, "*Adaptive Optics in Astronomy*", Cambridge University Press, Cambridge, England, 1999, pages 1-9), retinal imaging systems (E. N. Ribak et al., "*Speckle reduction in ocular wave front sensing*", Adaptive Optics: Analysis and Methods, OSA, Ed. B, Ellerbroek, Vancouver, Canada, June, 2007) and free space laser communication systems. Several researchers also applied liquid crystal phase mask based adaptive optics to compensate modal dispersion in MM fibers to improve communication bandwidth at longer fiber lengths (X. Shen et al., "*Compensation for multimode fiber dispersion by adaptive optics*", Optics Letters, Vol. 30, No. 22, 2005, pgs. 2985-2987).

Fiber lasers are another example of important optical fiber applications, wherein the modal structure is of great importance (G. P. Agrawal, "*Applications of non-linear fiber optics*", Academic Press, 2001, pages 201-250). For many years the development of fiber-coupled and active fiber lasers capable of maintaining high energy densities along with high beam quality has been a great challenge. Due to nonlinear processes and other thermal effects in fibers, parasitic modes are developed; the beam at the output of the fiber is then distorted, resulting in a reduction of beam quality.

The ability to dynamically control the modal structure of light in a fiber will greatly contribute to improvement of beam quality in these types of lasers, presently limited by optimization of static fiber properties only (for example large mode area and photonic crystal fibers—V. Laude et al., "*Photonic band-gap guidance of acoustic modes in photonic crystal fibers*", Phys. Rev B 71, 045107, 2005).

It is therefore clear that it would be greatly desirable to provide a method that obviates the disadvantages of the prior art thus improving the beam quality.

It is an object of the present invention to provide such a method, which exploits adaptive optics techniques to alter the structure of light propagating in optical fiber.

It is another object of the invention to provide a method that is simple to implement, using existing equipment, with relatively low cost as compared with the advantages achieved.

Other objects and advantages of the invention will become apparent through the following description.

SUMMARY OF THE INVENTION

The invention is a method of lowering the number of higher modes in a multimode (MM) beam propagating in a MM fiber. The method comprises:
 (a) activating at least one phase control actuator to introduce local controlled phase changes in the fiber or in free space at the input or output of the fiber;
 (b) monitoring the electro-magnetic field intensity distribution of the phase corrected beam with one of a wavefront sensor and a power sensor; and
 (c) applying actuator control algorithms to the output of at least one of the wavefront sensor and the power sensor to provide control feedback to the phase control actuators in a closed feedback loop.

The method allows mode population control with no power loss by shifting higher modes into lower modes.

In the embodiments of the method of the invention in which the phase correction takes place in free space at the fiber output the phase control actuator can be a deformable mirror or a liquid crystal spatial light modulator.

In the embodiments of the method of the invention in which the phase correction takes place within the MM fiber the local controlled refractive index changes can be caused in at least one of the following ways:
 (a) applying controlled mechanical stress at least one point along the fiber;
 (b) applying electric fields in MM fibers having a considerable electro-optic coefficient;
 (c) inserting the MM fiber into a waveguide made of material with a considerable electro-optic coefficient; and
 (d) using the magneto-optical Kerr effect in polarization maintaining fibers.

In embodiments of the method of the invention control feedback can be provided to the actuators from the phase sensors by using a Hartmann-Shack phase sensor and algorithm determining the relative displacement of the actuators along the deformable mirror.

In embodiments of the method of the invention control feedback can be provided to the actuators from phase sensors by focusing the corrected beam with a focusing lens and determining the spot size.

In embodiments of the method of the invention the MM fiber in which the phase correction takes place has a large core diameter and the output light from the MM fiber is coupled to a fiber having a smaller core diameter without loss of power.

In embodiments of the method of the invention the MM fiber in which the phase correction takes place is a pumping source and/or the gain medium of a fiber laser.

All the above and other characteristics and advantages of the invention will be further understood through the following illustrative and non-limitative description of embodiments thereof, with reference to the appended drawings.

DETAILED DESCRIPTION OF THE INVENTION

The invention relates to adaptive optics techniques applied to alter the modal structure of light propagating in an optical fiber. In particular the invention relates to altering the modal structure in a multimode beam propagating in a MM fiber by lowering the number of higher modes. The method comprises combining a wavefront sensor with a phase control actuator and actuator control algorithms, to alter the phase structure of the beam thereby to eliminate higher modes. The corrected beam can be then effectively coupled into a smaller diameter fiber with minimum loss of energy and concentrated to smaller spot sizes limited by diffraction.

The population of the modes propagating within a multimode fiber can be controlled by introducing a local in-homogeneity in the index of refraction via mode mixing. Usually, this in-homogeneity is naturally occurring, via physical fiber deformations, for example, and causes the modes to mix. Thus once light enters a multi-mode fiber from a single-fiber it cannot be coupled back into a single-mode fiber without a significant power loss.

The present invention comprises introducing local controlled refraction index changes and, by monitoring the output electro-magnetic field intensity distribution, controlling the mode population in a closed feedback loop. The local index of refraction changes can be caused by many methods, for example by the following:

1. Utilizing the elasto-optic effect, which relates mechanical stress to refraction index changes, one can control the fiber mode population by applying stress to the fiber. This can be realized in practice, for example, by rotating or bending the fiber or by locally applying force to the fiber inducing torsion, bending, shear or any other local stress.

Figure 1A:
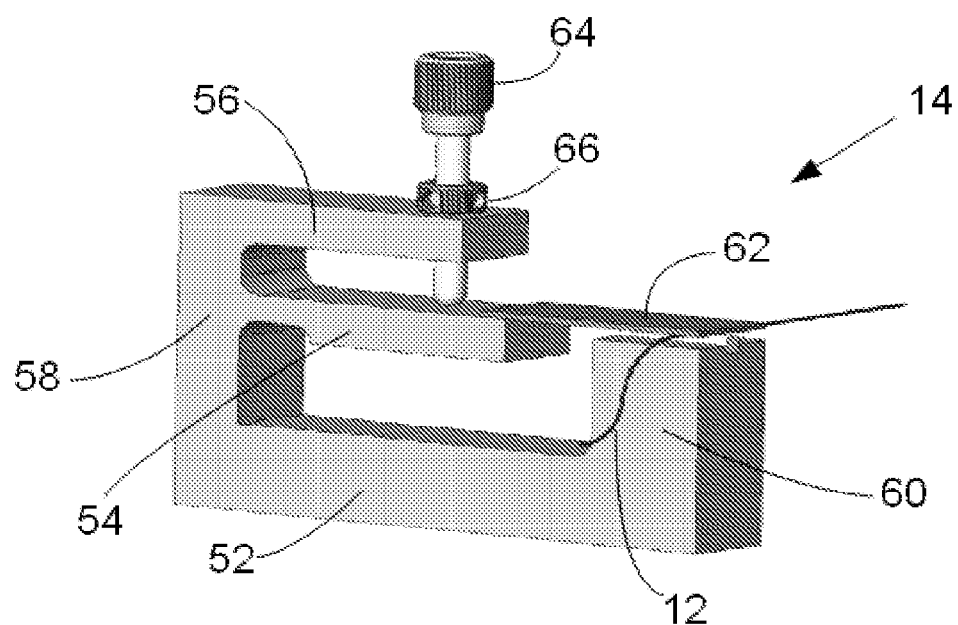
FIG. 1A schematically shows an example of a device that is used to induce stress in a fiber.

FIG. 1A schematically shows an example of a strain actuator 14 that is used to induce stress in a fiber 12. Actuator 14 is essentially an 'E' shaped frame comprised of three horizontal bars 52, 54, 56 connected to horizontal post 58. Lower horizontal bar 52 is longer than the other bars and attached has an upward projecting post 60 at its free end. Lower bar 52 and upper bar 56 are rigidly to post 58. Middle bar 54 is attached to post 58 such that it's end can be forced downward by turning screw 64 from a configuration in which bar 54 is parallel to bars 52 and 56 to a configuration in which the bars are no longer parallel and that it will return to its original configuration when screw 64 is screwed in the opposite direction so that screw 64 no longer exerts a downward force on bar 54. A projection 62 of piezoelectric material, which extends over the top of post 60, is rigidly attached to the top of bar 54. When a fiber 12 is passed through the space between the top of post 60 and the bottom of projection 62 a localized variable mechanical stress can be applied to fiber 12 by rotating screw 64 or applying controlled voltage to the piezoelectric element 62 so that it advances in the downward direction. Locking nut 66 prevents rotation of screw 64 once the desired localized stress in fiber 12 has been achieved, which is further controlled by voltage applied to the element 62 only.

Figure 1B:
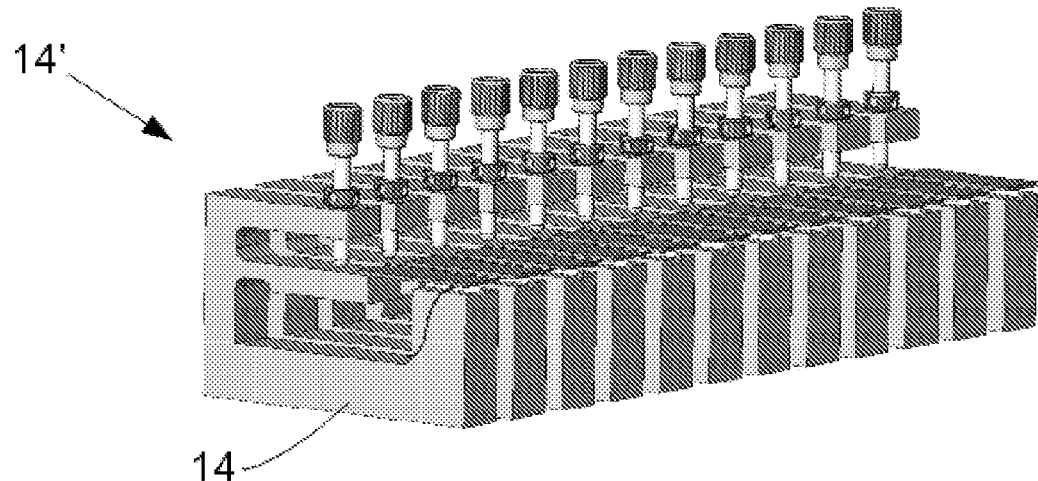
FIG. 1B schematically shows an apparatus for inducing a plurality of localized stresses, each having its own value, in a single fiber.

A plurality of localized stresses, each having its own value, can be induced in a single fiber 12 by connecting a plurality of devices 14 into an apparatus 14' as shown schematically in FIG. 1B.

Different local stress forms can be induced in the fiber's cross section by small changes of the geometry of the surfaces between which the fiber is pressed. In FIG. 1A the fiber is pressed between two planar surfaces. Another example would be to press the fiber between a cylinder and a flat piezoelectric bender. In another example two cylinders can be used to produce a different stress map. Obviously many configurations are possible.

Figure 2A:
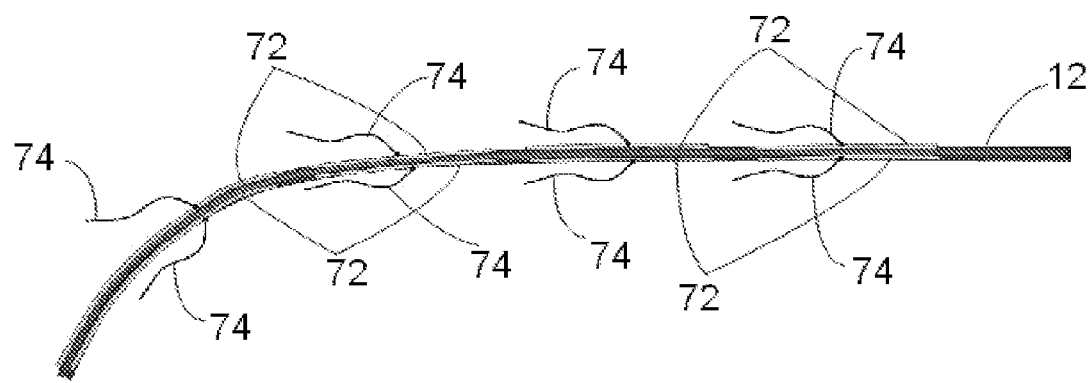
FIG. 2A schematically shows a MM fiber that satisfies the condition that it has considerable electro-optic coefficient.

2. Utilizing the electro-optic effect, which relates electrical field to refraction index changes, one can control the fiber mode population by applying electric fields in fibers that are made of materials that have a considerable electro-optic coefficient (for example Ge: doped fibers), wherein by 'considerable' is meant a coefficient greater than $10^{-7}$/volt. FIG. 2A schematically shows a MM fiber 12 that satisfies the condition that it has considerable electro-optic coefficient. Electrodes 72 connected by wires 74 to an external variable voltage source are located at selected locations along the length of fiber 12, By applying selected voltages to each of the electrodes 74, an electric field is created that causes the desired localized changes in the refractive index of the material of the fiber.

Figure 2B:
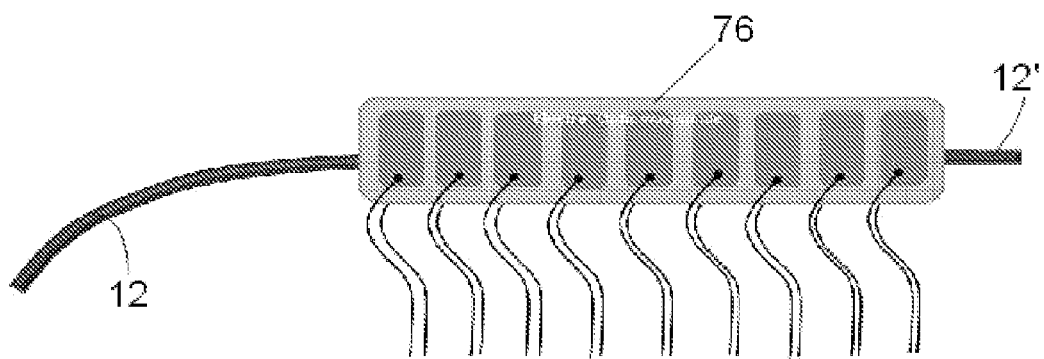
FIG. 2B schematically shows an optical fiber coupled to an electro-optic waveguide.

Alternatively, the multimode fiber 12 can be inserted into a wave-guide 76 made of a material with considerable electro-optic coefficient. In this way the mode population is corrected outside of the fiber and the high brightness corrected beam can be transmitted to free space or coupled again to an optical fiber of a lower beam parameter product. Unlike conventional electro-optic waveguides (those used in optical modulators, for example), where great care is taken to induce a single even phase shift profile across the waveguide cross-section, the present invention utilizes a series of anisotropic phase masks. This makes the requirements on the wave-guide electro-poling as well as the on field applied by each of the phase elements much looser and the design much simpler. An optical fiber 12 coupled to an electro-optic waveguide is shown schematically in FIG. 2B, where the poled-waveguide 76 is represented by the light grey rectangle and the electrodes of the individual phase elements within the waveguide are represented by the light grey rectangles. A second fiber 12' is shown coupled to the output of the waveguide.

3. Utilizing the magneto-optical Kerr effect, which relates the index of refraction, the polarization of light, and the local magnetic field, one can control the phase velocity of the propagating modes in polarization maintaining (PM) fibers.

It should stressed out that unlike the commonly used approaches to control the mode population in fibers that are adapted to cause high order modes to leak out of the fibers and thus necessarily lose optical power the present invention shifts the unwanted modes to wanted modes within the fiber thus allowing mode population control with no power loss.

According to the present invention a wavefront sensor is combined with a phase control actuator and actuator control algorithms to alter the phase structure of the beam in such a way that higher modes are eliminated, thus improving the beam quality by significant factors up to the quality of a single mode beam.

As will be apparent to a skilled person, more than one method can be employed to carry out the invention. Two such suitable methods are:

A. Phase correction in free-space at fiber input or output using a deformable mirror. In this method the low brightness beam is corrected by using an adaptive-optics element such a deformable mirror (DM) or a liquid crystal spatial light modulator (LC-SLM). The corrected beam can be either transmitted to free space or coupled back into an optical fiber of lower beam parameter product.

B. Manipulating the phase inside the fiber using controlled strain at a number of points along the fiber as described herein above.

Two examples of suitable methods of feedback to actuators from phase sensors that can be used to measure the beam error in order to correct it comprise:

A. Hartmann-Shack phase sensor and algorithm determining the relative displacement of actuators along the deformable mirror.

B. Focusing the corrected beam with a focusing lens and determining the spot size, which is linked with number of higher modes in the beam. The actuators then may be moved according to specific convergent algorithm (X. Shen et al., 2005, op cit) in a manner minimizing the resulting spot size on the sensor.

Figure 3:
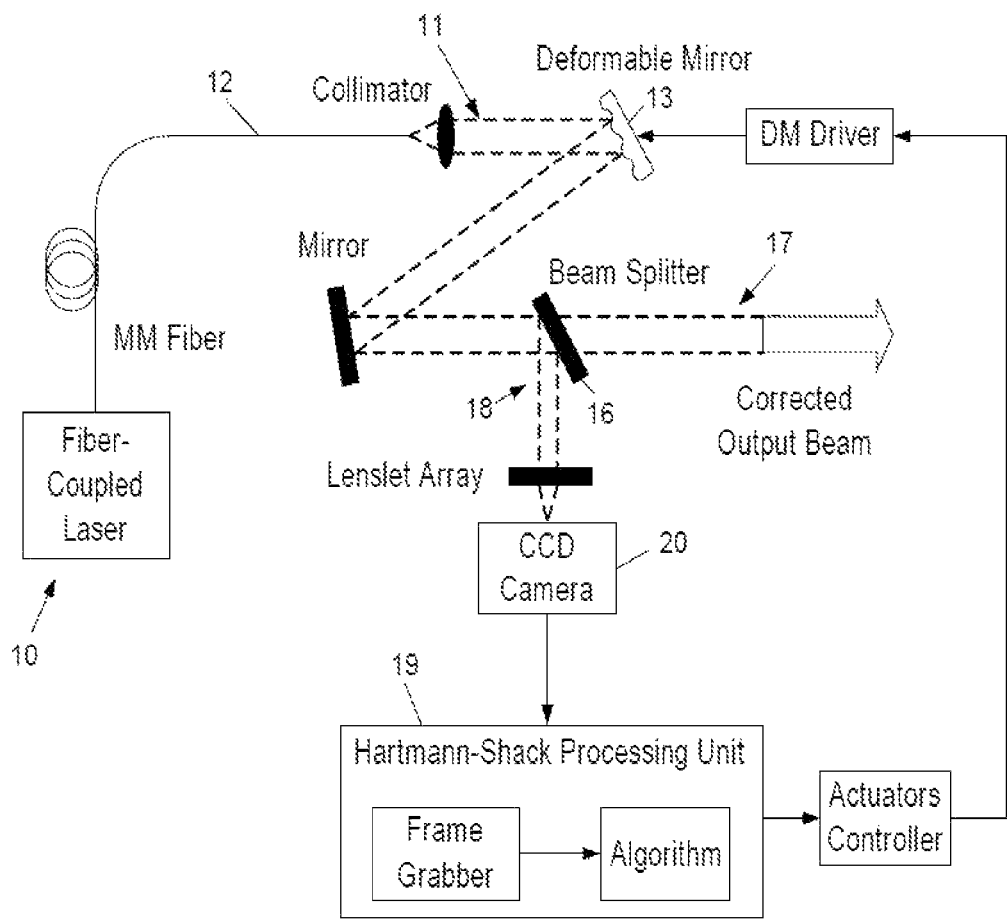
FIG. 3 to FIG. 6 schematically show experimental setups useful to test embodiments of the invention.
Figure 4:
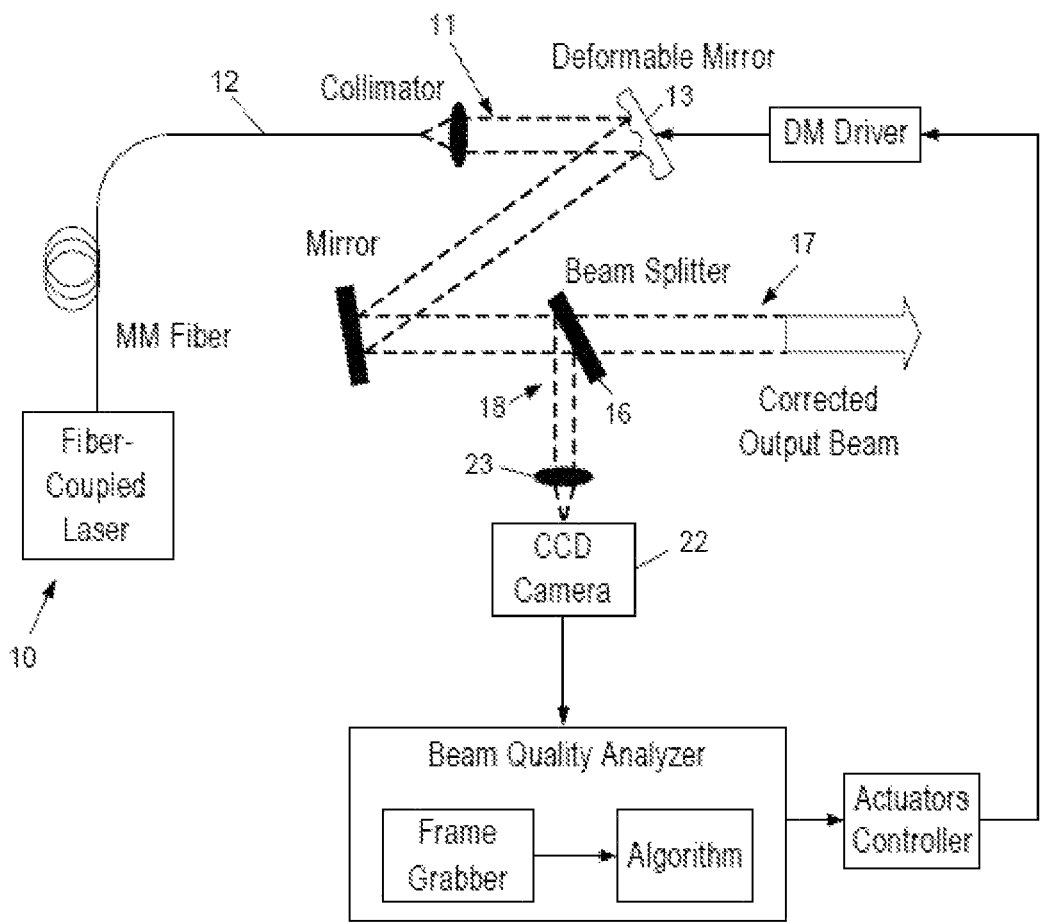
Figure 5:
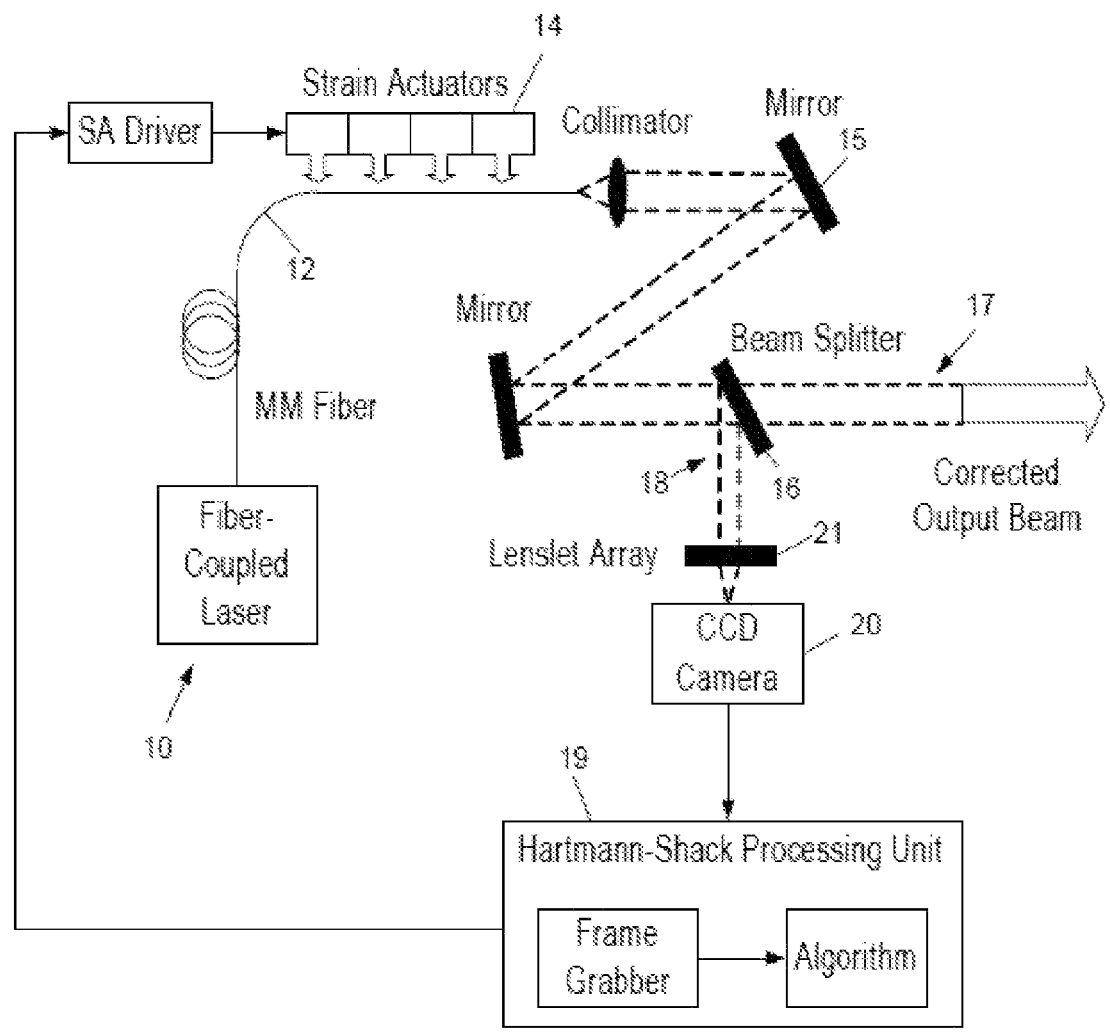
Figure 6:
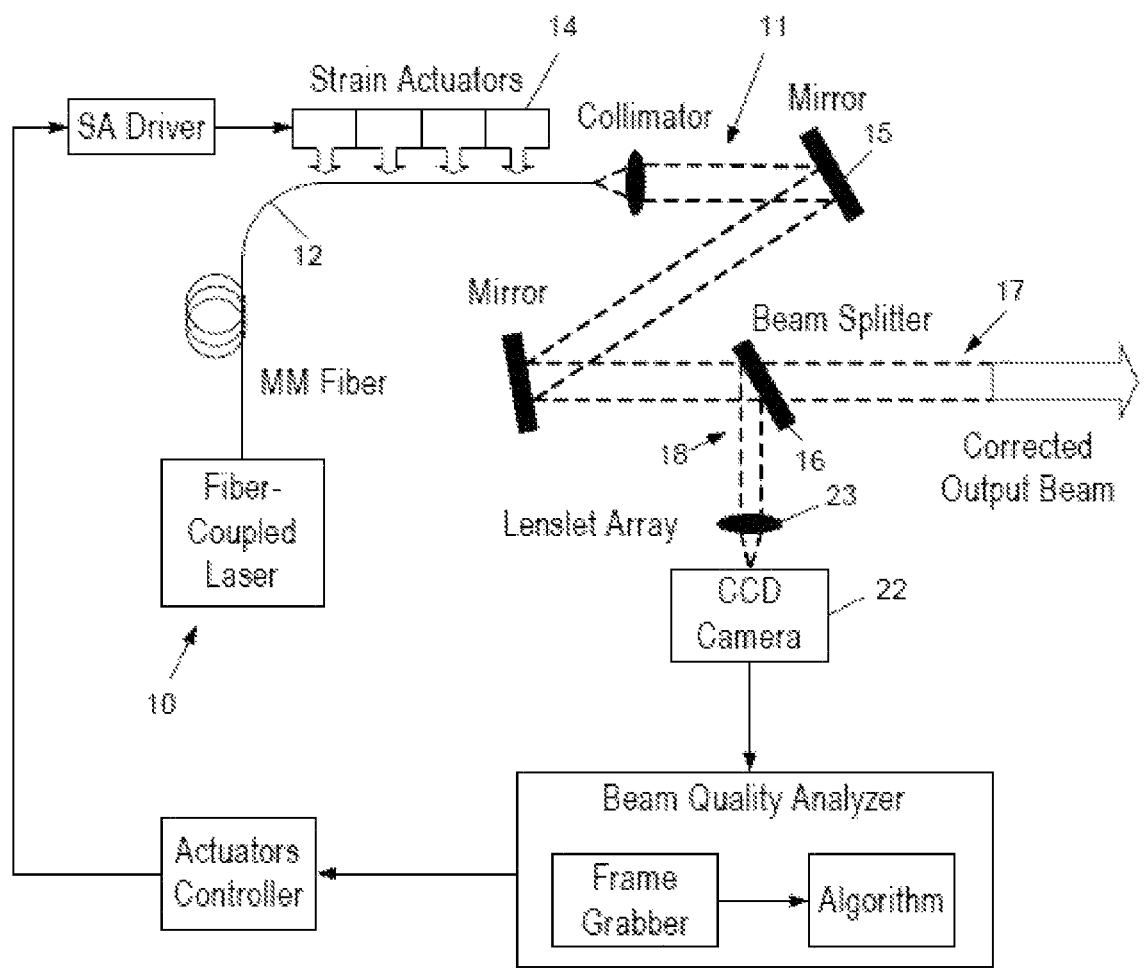

The ways of implementing the invention mentioned above are illustrated in FIGS. 3 through 6, which schematically show experimental setups useful for implementing the invention. These experimental setups are self-explanatory and thus will only be briefly detailed herein. The setup may include a multimode fiber-coupled collimated laser 10; a collimated beam 11 exiting the multimode fiber 12 can then be projected onto a deformable mirror 13 (FIGS. 3 and 4), which can be used as a phase altering device. Alternatively, strain actuators 14, e.g. such as shown in FIG. 1A and FIG. 1B, can be placed along the fiber 12 (FIGS. 5 and 6) to control the modal structure. A folding mirror 15 can be used for alignment purposes, and a beam splitter 16 can split the beam into two perpendicular paths 17 and 18. The reflected path 18 can be followed by Hartmann-Shack wavefront phase sensor 19 (FIGS. 3 and 5), utilizing a CCD camera 20 and a lenslet array 21. The phase distribution can be analyzed using image post-processing. Alternatively, the reflected path can be focused on a CCD camera 22 by a focusing lens 23 (FIGS. 4 and 6), employed in order to measure the spot size of the focused beam while performing modes manipulation; the forward path is used for the transmission of the output corrected beam.

Applications of the Method

The present invention can be applied in all applications where the divergence (N.A.) of light within optical fibers, or keeping a low number of modes within a fiber of a given (typically, large) core diameter is of importance. Some examples of these applications are given below and illustrated schematically in the FIG. 7 to FIG. 11. In all of these figures the light is traveling from left to right, i.e. from many fibers to one single fiber (coupler) or from a large diameter fiber to a narrower one. The adaptive stage 100 on the main fiber is either strain actuators 14 or a deformable mirror 13 as shown in FIG. 3 to FIG. 6.

Figure 7:
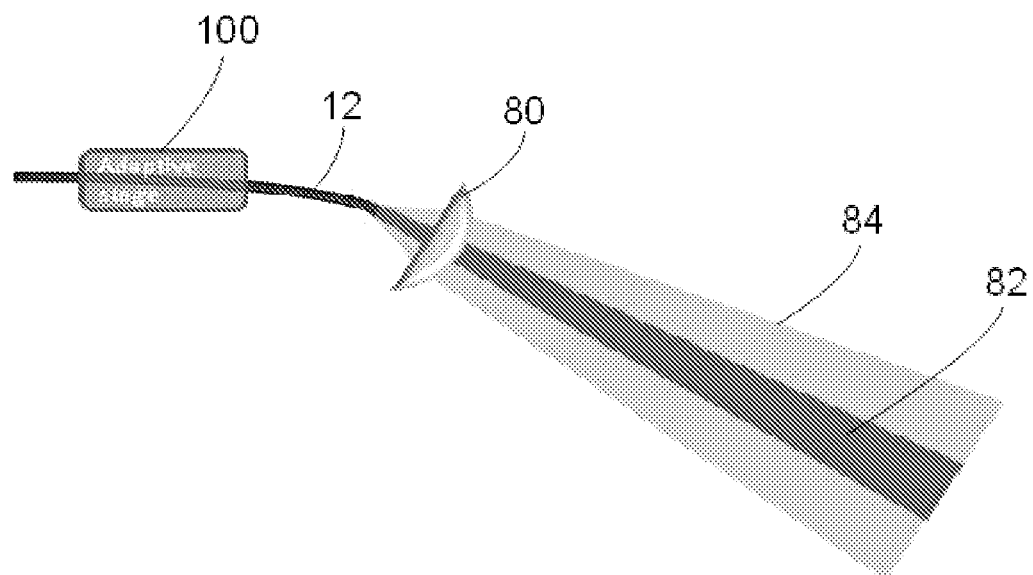
FIG. 7 schematically shows the divergence after exiting a fiber of a beam treated according to the invention as compared to an untreated beam.

1. Increasing the Irradiance in Power Delivery Applications:

In applications where the maximum irradiance of a given multi-fiber source is sought, keeping a low number of modes reduces the beam divergence for a given beam size thus increasing the beam intensity. This application is illustrated in FIG. 7, which schematically shows the divergence of a beam 82 treated according to the invention as compared to an untreated beam 84 that exits fiber 12 and passes through collimating lens 80.

Figure 8A:
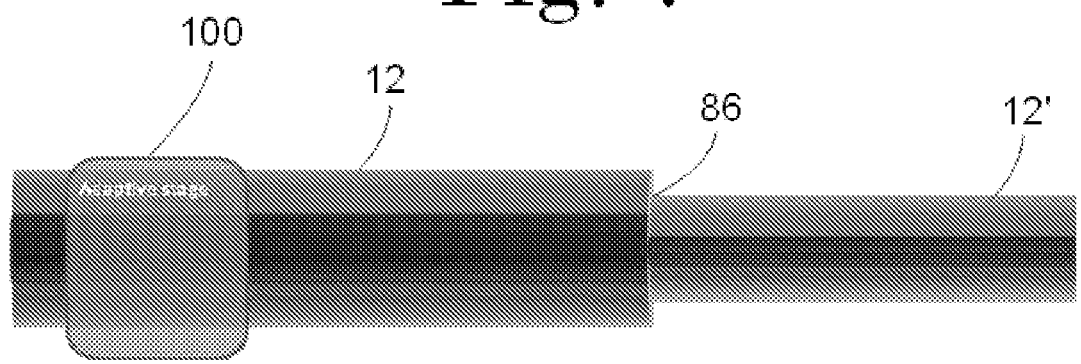
FIG. 8A and FIG. 8B schematically illustrate how the invention allows coupling light from large core fibers to fibers of smaller core without loss of power.
Figure 8B:
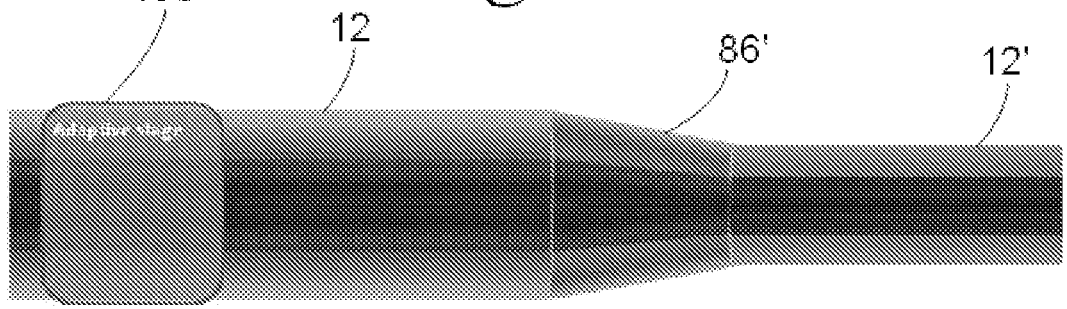

2. Reducing Fiber-optic Diameters:

Controlling the population of modes within an optical fiber makes the effective divergence and effective mode diameter of the light guided in the fiber (N.A.) smaller than the N.A. and mode diameter for which the fiber was designed. This allows coupling light from large core fibers 12 to fibers of smaller core 12' without loss of power. This can be done either by direct splice 86 or by a taper 86' to the fiber as shown in FIG. 8A and FIG. 8B respectively. The fibers are illustrated schematically by two shades of gray to represent the core and the cladding.

Figure 9:
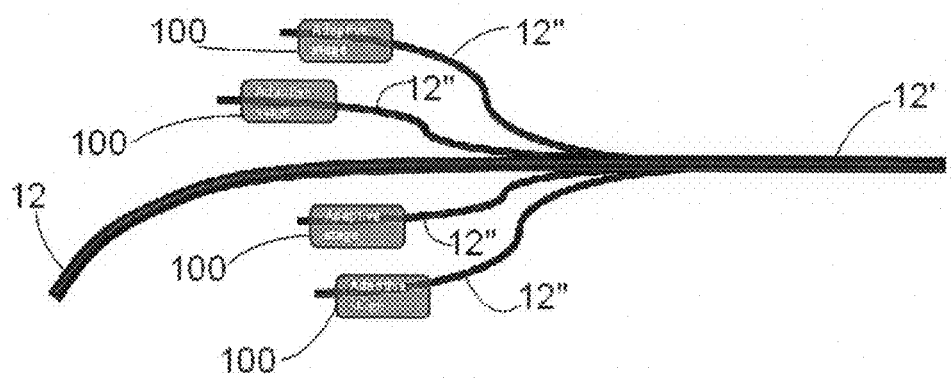
FIG. 9 schematically show how the invention allows improvement of pumping power launched into the fiber laser by increasing brightness of pumping sources.

3. Efficient Fiber Combiners:

The low effective N.A. and mode diameter of the mode-controlled fiber allows making efficient pumping sources for high power lasers, where the power is introduced through an adaptive stage 100. Such an arrangement is schematically shown in FIG. 9.

Figure 10:
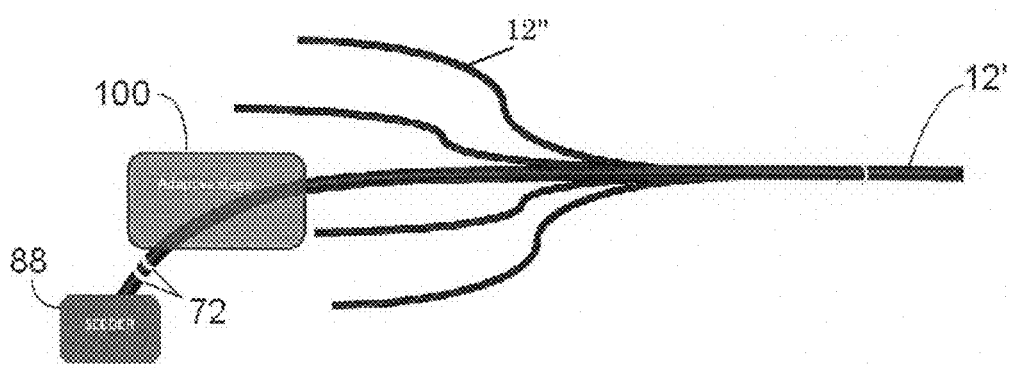
FIG. 10 schematically shows how to controlling the mode population according to the invention can be used to make a large core multimode fiber laser with only lower modes populated resulting in high brightness gain medium with thermal and nonlinear effects reduced.
Figure 11:
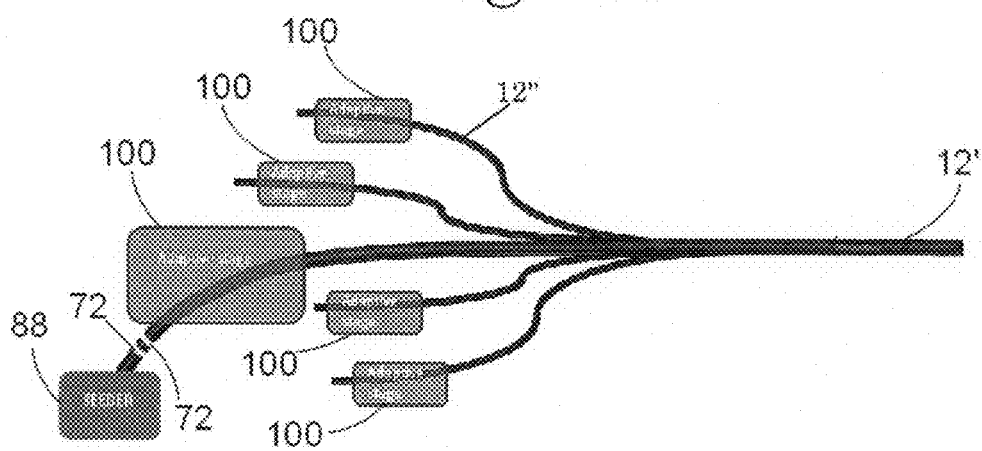
FIG. 11 schematically shows how the invention allows the combination of high brightness pump modules and high brightness gain medium.

4. High Brightness Fiber Laser Gain Modules with Large Cores:

Fiber-laser need to have high brightness (low NA and effective mode diameter) to be effectively focused to small spot sizes. On the other hand, making fiber sources with small fiber cores, for a given N.A., is extremely challenging due to various technological difficulties, such as thermal and non-linear effects directly related to total power density, which is inverse squarely scaled with fiber core diameter. Large core fibers necessarily allow higher modes to populate without significant losses. Thus, by controlling the mode population, one can have efficient fiber laser gain modules as used with fiber laser and fiber amplifiers that have a large core but still maintaining a low mode or single mode operation. This is shown schematically in FIG. 10. Symbolically shown in FIG. 10 and FIG. 11 are fiber gain modules comprising a laser seeder 88 and pumping fibers 12", which amplify the laser in fiber 12'. The mode population within the fiber 12' is optimized by the adaptive stage 100.

5. Efficient High Brightness Fiber-lasers:

High power fiber lasers have to have large core diameters in order to avoid fiber damage and non-linear effects due to high energy concentration. However, typically, increasing the fiber power means increasing the core diameters and thus lowering the laser brightness. On the other hand, a population controlled active-fiber, can have a large core and still be a very high brightness gain medium for a fiber laser or a fiber amplifier. The combination of the high brightness pump modules and high brightness gain medium is shown schematically in FIG. 11.

EXAMPLES

1. Effect of Controlled Strain on Modes Propagation in Optical Fibers

A theoretical explanation and algorithm for active controlled stress actuation in optical fiber intended to achieve a specific goal (such as brightness enhancement or power in a given area maximization) is now described. Consider for example an optical fiber with quadratic refraction index profile of:

$$n(r) = n\left(1 - \frac{n_2}{n}r^2\right)^{1/2}$$

The scalar electric field inside the fiber can be described as follows:

$$E(x,y,z) = \Sigma_{m=1}^{N}\Sigma_{n=1}^{N}\alpha_{mn}T_{mn}(x,y)e^{i\beta_{mn}z}$$

Where the fiber optical modes are:

$$T_{mn}(x,y) = \frac{1}{\sqrt{\omega_x\omega_y}\sqrt{\pi}\sqrt{(m-1)!(n-1)!2^{m+n-3}}}H_m\left(\frac{\sqrt{2}x}{\omega_x}\right)H_n\left(\frac{\sqrt{2}y}{\omega_y}\right)e^{-\frac{x^2}{\omega_x^2}-\frac{y^2}{\omega_y^2}}$$

and where $\beta_{mn} = k\left[1 - \frac{2}{k}\sqrt{\frac{n_2}{n}}(m+n+1)\right]^{1/2}$ The model for fiber distortions is derived herein. Assume the following modal distribution at z=0 position within the fiber:

$$\alpha_{mn} = \frac{\zeta}{(m^2+n^2)^\nu}$$

Where $\zeta$ is random number ranging [−1, 1] with flat distribution and $\nu$ is a constant defining the modal constitution of the beam.

The beam segment is distorted by phase masks located at predefined positions $z_i$ with phase distortion of:

$$\Delta\Phi = k\Delta n\Delta z = kC_\sigma\Delta z\sigma$$

where $C_\sigma$ is stress optical coefficient, $\Delta z$ is stress longitudinal effective dimension and $\sigma$ is the average applied stress.

The distorted beam can be then described as follows:

$$E^*(x,y) = E(x,y)e^{i\Delta\Phi(x,y)}$$

The updated modal distribution of the disturbed field can be calculated by projecting the disturbed field distribution onto the basic fiber modes.

$$\alpha_{mn}^* = \iint E(x,y)^*T_{mn}(x,y)dxdy = \iint E(x,y)e^{i\Delta\Phi(x,y)}T_{mn}(x,y)dxdy$$

Assume the initial field distribution E(x,y,z)=0). At each actuation point $z_i$ the field is:

$$E(x,y,z_i) = \Sigma_{m=1}^{N}\Sigma_{n=1}^{N}\alpha_{mn}T_{mn}(x,y)e^{i\beta_{mn}z_i}$$

The mode overlap integrals are evaluated as follows:

$$a_{mn}^* = \int\int_0^R \sum_{k,l=1}^{N}\alpha_{ki}T_{kl}(x,y)e^{i\beta_{kl}x_i}e^{i\Delta+(r)}T_{mn}(x,y)dxdy$$

$$= \sum_{k,l=1}^{N}\alpha_{kl}\Phi_{kl}^{mn}e^{i\beta_{kl}x_i}$$

The last term is the perturbation for the modal distribution of the field, where the following tensor can be evaluated:

$$\Phi_{kl}^{mn} = \iint_{r_c}^R T_{kl}(x,y)T_{mn}(x,y)e^{i\Delta\Phi(x,y)}dxdy$$

After the actuator phase disturbance, the updated $\alpha_{mn}^*$ mode coefficients are computed and the field is propagated to the next actuation point $z_{i+1}$.

The following describes the convergence algorithm applied to determine the optimal set of applied stress values to a give set of actuators in order to minimize a certain merit function.

Assume that there are N actuators located at $z=z_1, z_2, \ldots z_n$) and stress $\sigma=(\sigma_1, \sigma_2, \ldots \sigma_N)$ is applied on each of them. Starting at a random initial stress $\sigma(0)$, a convergent iterative procedure is applied. A random direction is selected $d=(d_i)$, where each $d_i$ can be +1 or −1. An iteration step $\Delta$ is selected. At each iteration, the stress vector is updated according to:

$$\sigma(k+1)=\sigma(k)+\Gamma d^k q$$

where q is the merit function derivative to be minimized.

$$q=F(\sigma(k)+d^k\Delta)-F(\sigma(k)-d^k\Delta)$$

and $\Gamma$ is constant ranging typically between 0.001 to 0.01 of $$\frac{(\sigma(k))}{(q)}.$$

2. Calculation of Stress Distribution and Beam Propagation in Realistic Optical Fiber Under Transverse Actuation The following exemplary mechanical finite element and beam propagation simulation shows the effect of stress application to optical fiber.

Figure 12:
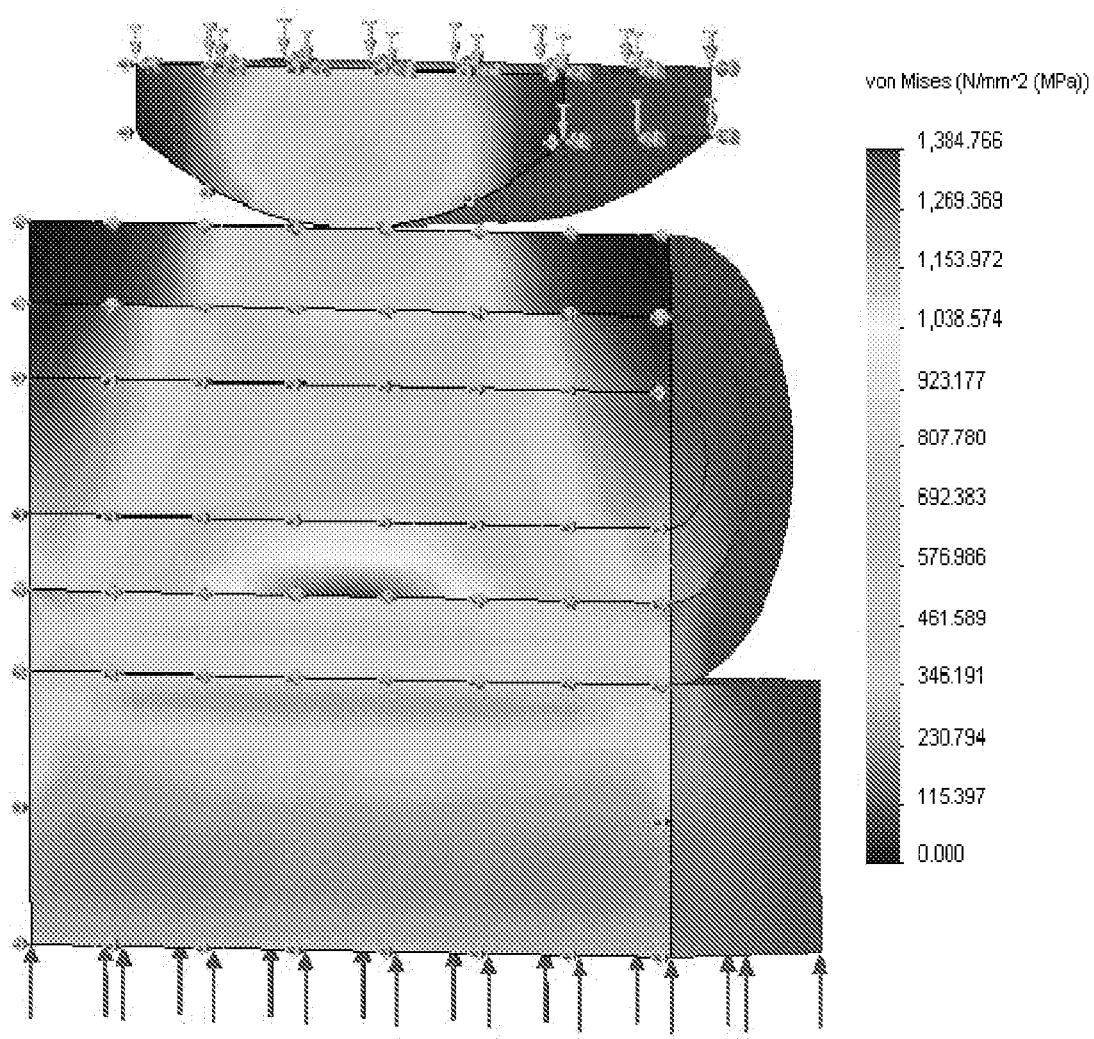
FIG. 12 shows a simulation of stress distribution in the optical fiber core, clad and jacket as a result of external force applied.

FIG. 12 shows a stress distribution in a core/clad/polymer jacket optical fiber induced by mechanical actuation applied in the transverse direction on the fiber jacket.

A typical elasto-optic coefficient $C_o$ of fused silica is $2.5 \times 10^{-12}$ Pa$^{-1}$. Using the above value and the simulated stress distribution, the effect on the fiber output field distribution is calculated and presented in FIG. 14. This simulation shows that stress up to 1 GPa causes a significant modes mixing in multimode optical fiber.

Figure 13:
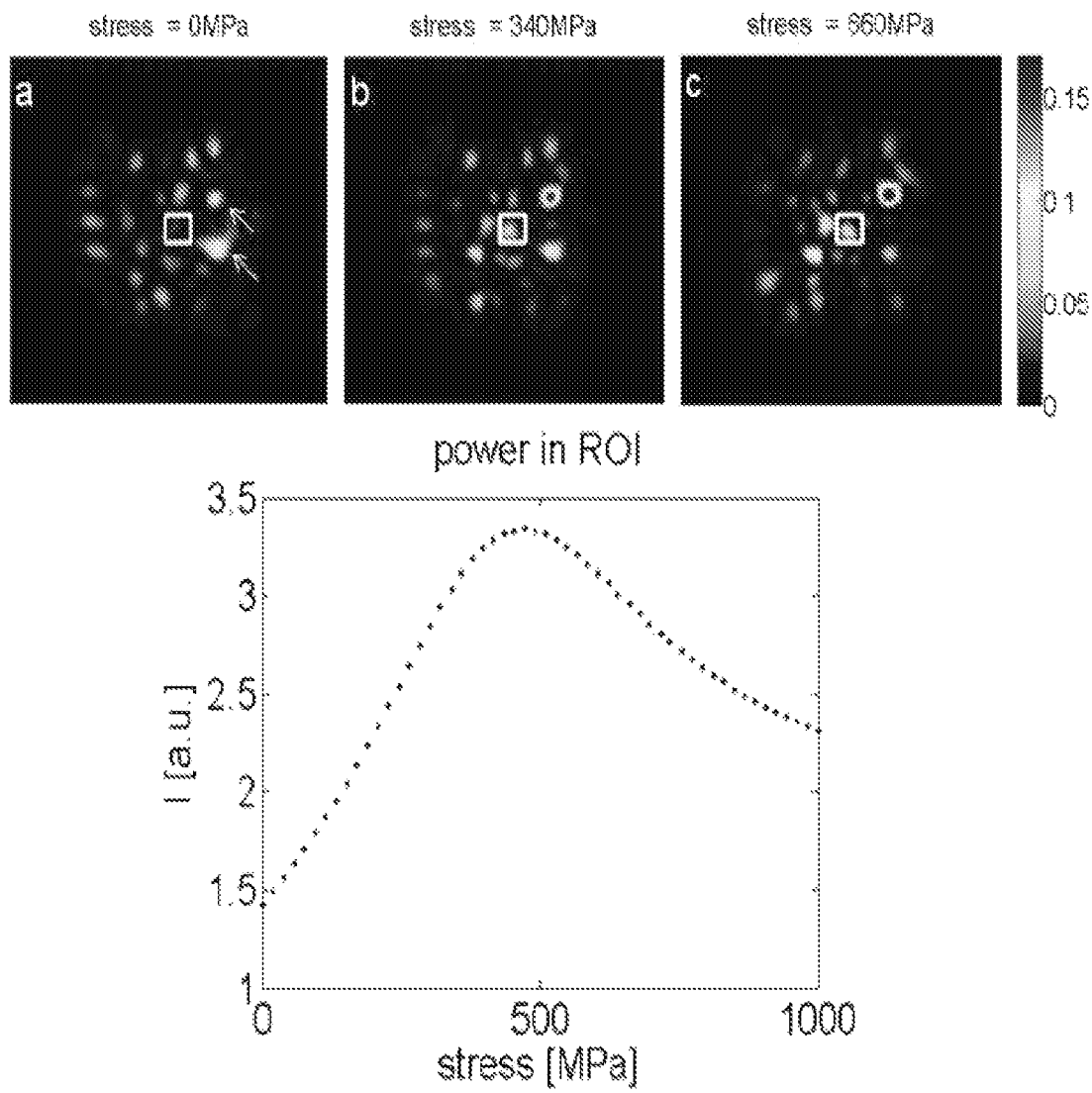
FIG. 13 shows calculated results of the effect of simulated stress distributions on the fiber output field distribution.

The top three images in FIG. 13 show (from left to right) simulations of the light intensity at the multimode optical fiber output capable of carrying 100 transverse modes for an applied stress of 0 MPa, 340 MPa, and 660 MPa respectively. Note a substantial intensity change in the speckles marked by the arrows in the left image. The graph at the bottom shows the mean intensity (in arbitrary units) in the region of interest (ROI) marked by the square in the images above.

Brightness Enhancement in 100 um Optical Fiber

This example presents an implementation of brightness enhancement in a 100 µm core/NA 0.08 optical fiber typically used in higher power fiber lasers.

Figure 14A:
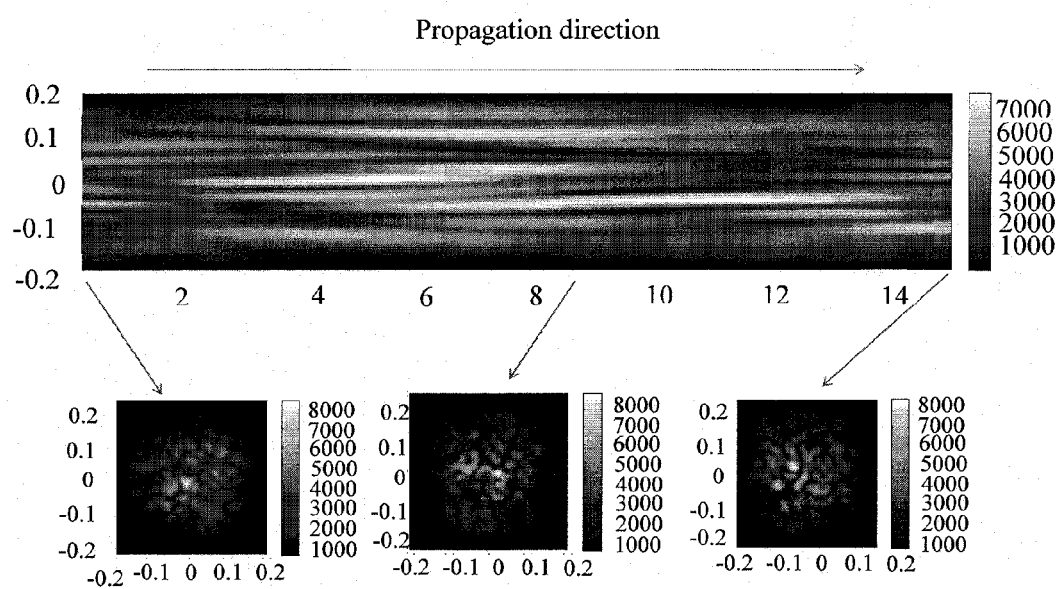
FIG. 14A shows an intensity distribution along a 15 mm propagation length in an undisturbed optical fiber and transverse intensity maps at three selected points.
Figure 14B:
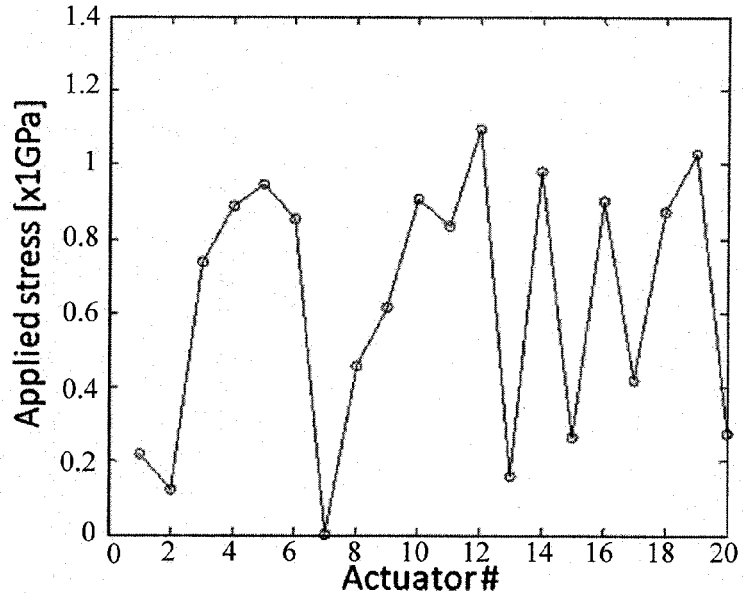
FIG. 14B shows the resultant stress values on each actuator after applying the optimization procedure of the invention to the optical fiber of FIG. 14A.

The upper image in FIG. 14A shows an intensity distribution along a 15 mm propagation length in an undisturbed optical fiber. The lower three images show transverse intensity maps at three selected points. The transverse intensity maps show high random speckling resulting from modal dispersion.

The convergent optimization algorithm described in example 1 herein above was applied to 20 stress actuators separated by an average of 5 mm one from each other with ±1 mm random position error. The optimization procedure resulted in stress values shown in the FIG. 14B.

Figure 14C:
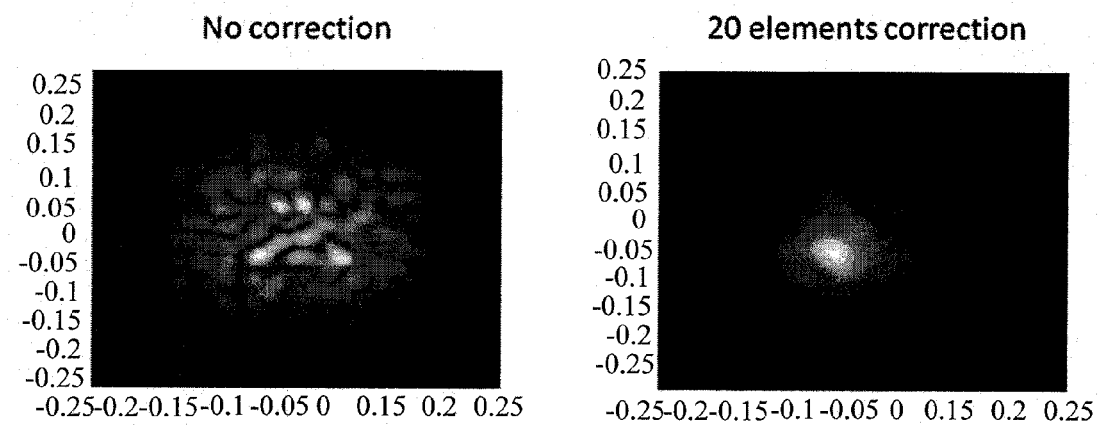
FIG. 14C shows an intensity distribution at the output of the fiber of FIG. 14A without applied stress actuators and after the optimization of brightness by applying stresses as shown in FIG. 14B.

FIG. 14C shows an intensity distribution at the fiber output without applied stress actuators (left image) and after the optimization of brightness (right image).

Figure 14D:
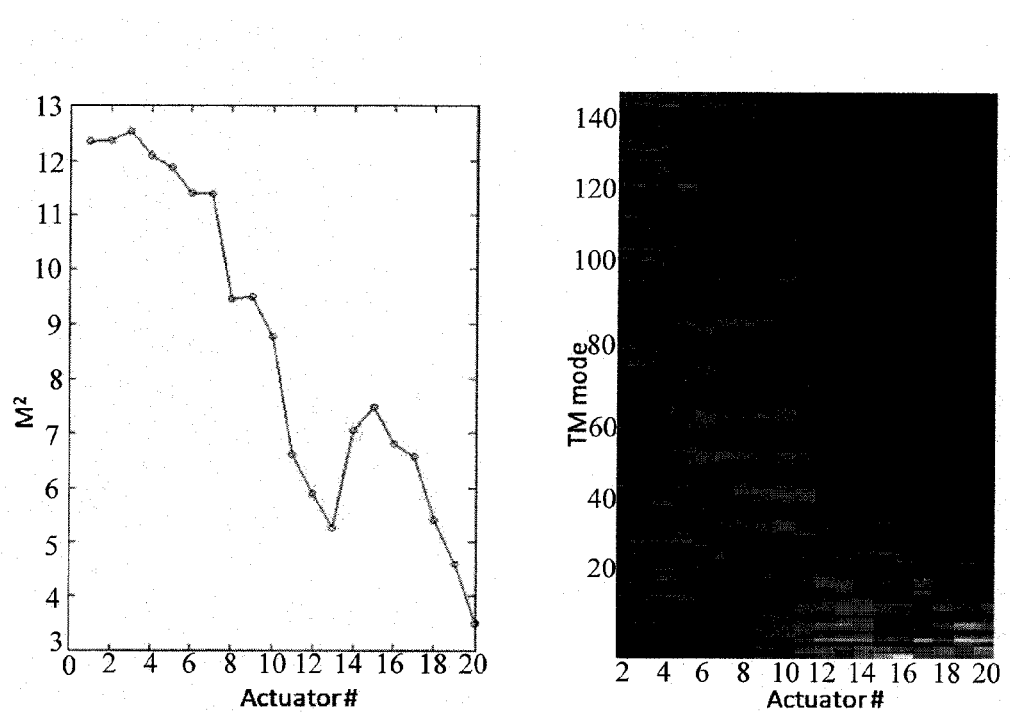
FIG. 14D shows the effective beam quality of the light propagating within the fiber of FIG. 14B after each actuator and the modes composition of the light propagating in the fiber.

FIG. 14D shows (graph on the left) the effective beam quality of the light propagating within the fiber after each actuator; showing a progressive improvement after each actuator. The image on the right of FIG. 14D shows the modes composition of the light propagating in the fiber. This image shows that an optimized mixing of the modes transfers energy from higher modes to lower ones.

Figure 15A:
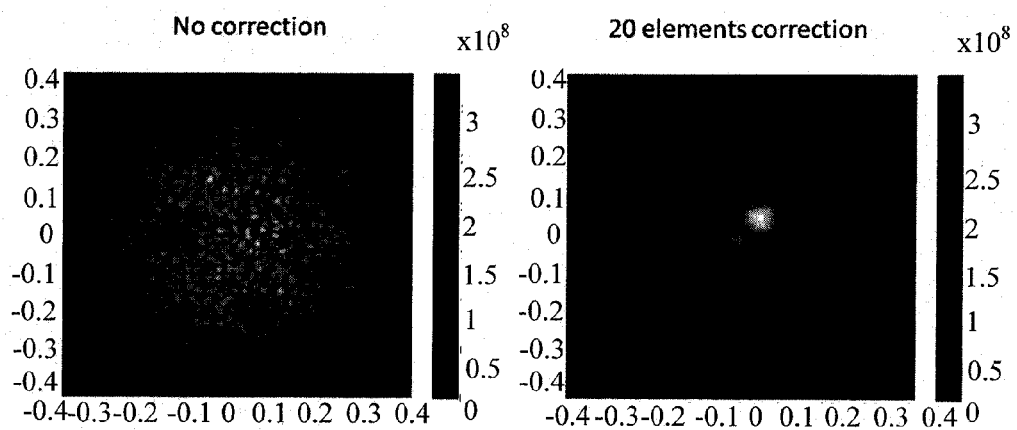
FIG. 15A shows an intensity distribution at the output of a 200 μm core/NA 0.14 optical fiber without applied stress actuators and after the optimization of brightness according to the method of the invention.

3. Brightness Enhancement in 200 Um Optical Fiber Example and Effect of the Number of Actuators This example presents an implementation of brightness enhancement in a 200 um core/NA 0.14 optical fiber typically used in fiber coupled diode lasers. FIG. 15A shows an intensity distribution at the fiber output without applied stress actuators (left image) and after the optimization of brightness according to the method of the invention (right image).

Figure 15B:
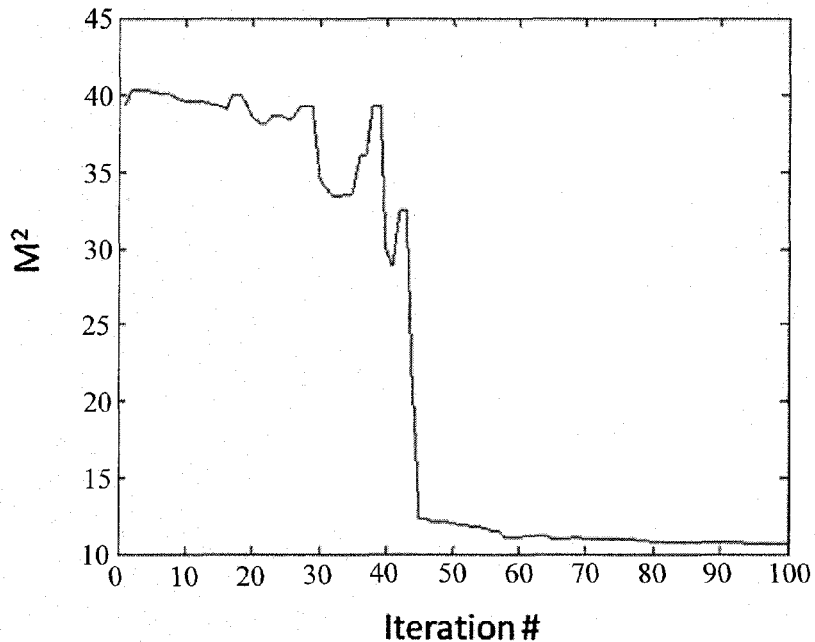
FIG. 15B shows a typical convergence of the iterative algorithm described herein.

FIG. 15B shows a typical convergence of the iterative algorithm described in example 1 herein above. Typically about 50 iterations are required for 90% convergence. This means that if a typical stress actuator can be operated at 2 kHz frequency and the detector can be sampled at this frequency as well, a total bandwidth of 40 Hz for the total correction can be achieved.

Figure 15C:
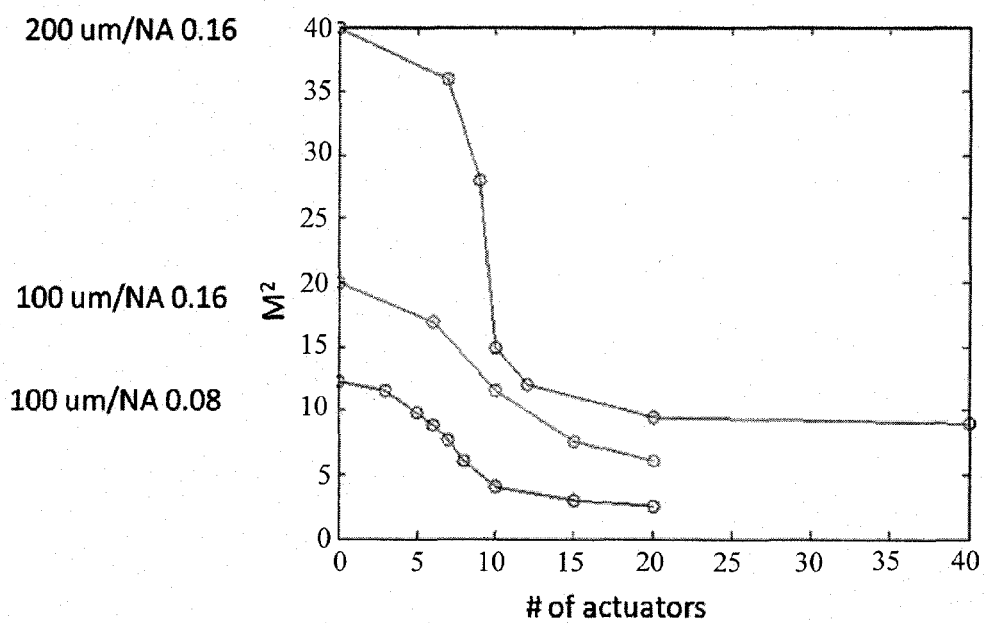
FIG. 15C shows the beam quality improvement of the output radiation from 3 different optical fibers versus total number of actuators.

FIG. 15C shows the beam quality improvement of the output radiation from 3 different optical fibers versus total number of actuators. It can be seen that a total number of 20 actuators are required to achieve >90% of the possible brightness/beam quality improvement.

Figure 16A:
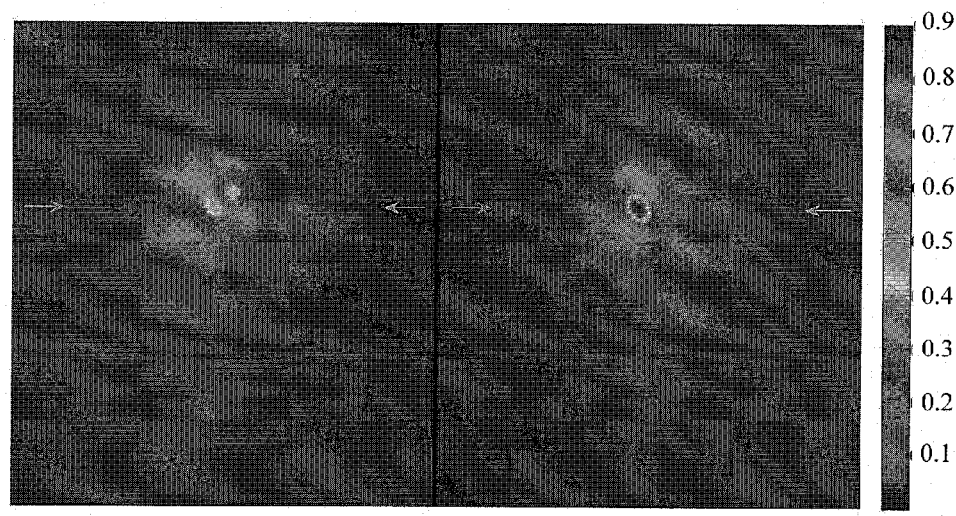
FIGS. 16A and 16B show the results of an experiment that was performed using a MEMS deformable mirror placed in the optical path of a beam diverging from a large mode area multimode fiber.
Figure 16B:
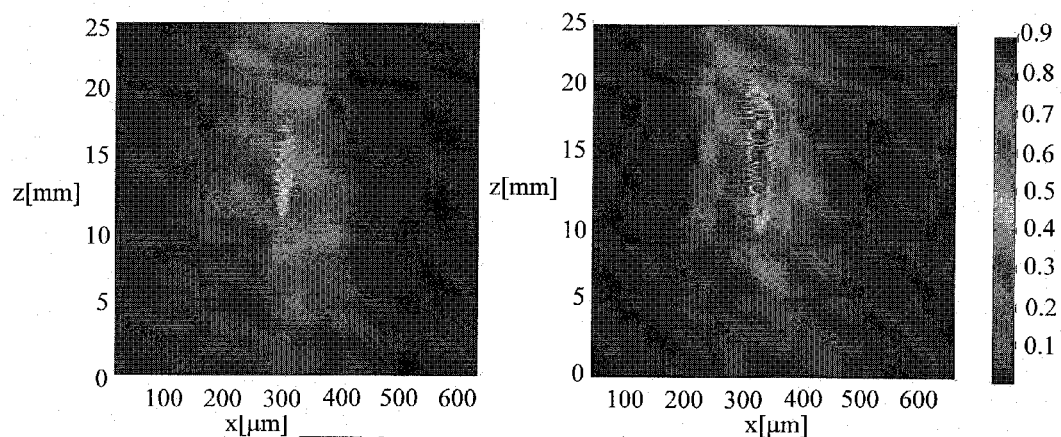

4. Experimental Example of Brightness Enhancement in 100 um/NA 0.08 Optical Fiber Using Adaptive Mirror A setup according to the present invention comprising an adaptive mirror and feedback from focused spot power in the bucket detector was used to demonstrate the invention. In this demonstration a highly divergent multimode beam was adaptively corrected and the beam parameter product or beam $M^2$ was reduced by passing the beam through a free-space adaptive optics corrector. In the experiment that was performed, and whose results are shown in FIGS. 16A and 16B, a MEMS deformable mirror was placed in the optical path of the beam diverging from a 100 µm large mode area (LMA) multimode fiber and then the beam was focused on a photosensitive diode covered with a pin-hole. By using the power on the photosensitive diode as an error function the beam front could be iteratively corrected and focused to a smaller spot increasing the power through the pin-hole by a factor of 2.

FIG. 16A shows the beam profiles of the output of a 100 µm large-mode-area (LMA) multi-mode fiber at the focal plane of a f=25 cm converging lens. Typically, the multiple modes within the fiber cause speckles at the focal plane, which focus at slightly different distances from the lens (left image).

When the phase front is corrected by an adaptive corrector, in this case a deformable mirror, the beam can be focused to a single spot (right image).

FIG. 16B shows the power measured by the beam profiler at the row indicated by the arrows in FIG. 16A (x axis) at various distances from the lens (z axis). The uncorrected beam (left image) shows a significantly larger beam waist and lower peak intensity compared with the corrected beam (right image).

Although embodiments of the invention have been described by way of illustration, it will be understood that the invention may be carried out with many variations, modifications, and adaptations, without exceeding the scope of the claims.

The invention claimed is:

1. A method for lowering a number of higher modes in a multimode (MM) beam propagating in a MM fiber, said method comprising:
   (a) activating at least one phase control actuator to introduce local controlled phase changes in said fiber at the input or output of said fiber;
   (b) monitoring the electro-magnetic field intensity distribution of the phase corrected beam with at least one of a wavefront sensor and a power sensor; and
   (c) applying actuator control algorithms to the output of at least one of said wavefront sensor and said power sensor to provide control feedback to said phase control actuators in a closed feedback loop;
   thereby allowing mode population control with no power loss by shifting higher modes into lower modes;
   wherein the phase correction takes place within the MM fiber by causing local controlled refractive index changes in at least one of the following ways:
   (i) applying controlled mechanical stress at least one point along the fiber;
   (ii) applying electric fields in MM fibers having a considerable electro-optic coefficient;
   (iii) inserting the MM fiber into a waveguide made of material with a considerable electro-optic coefficient; and
   (iv) using the magneto-optical Kerr effect in polarization maintaining fibers.

2. A method according to claim 1, wherein control feedback is provided to the actuators from phase sensors by focusing the corrected beam with a focusing lens and determining the spot size.

3. A method according to claim 1, wherein the MM fiber in which the phase correction takes place has a core diameter and the output light from said MM fiber is coupled to a fiber having a smaller core without loss of power.

4. A method according to claim 1, wherein the MM fiber in which the phase correction takes place is at least one of the gain medium or a pumping source of a fiber laser.

* * * * *